(No Model.)
W. D. HAWLEY.
CLAMP.
No. 376,304. Patented Jan. 10, 1888.
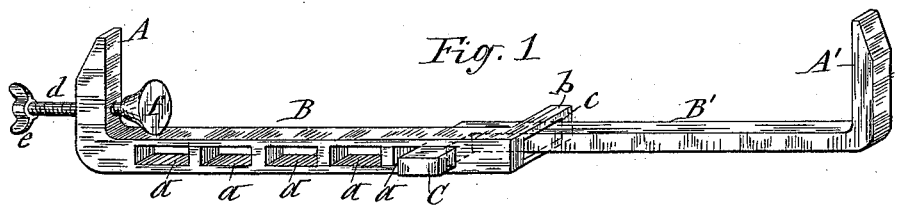
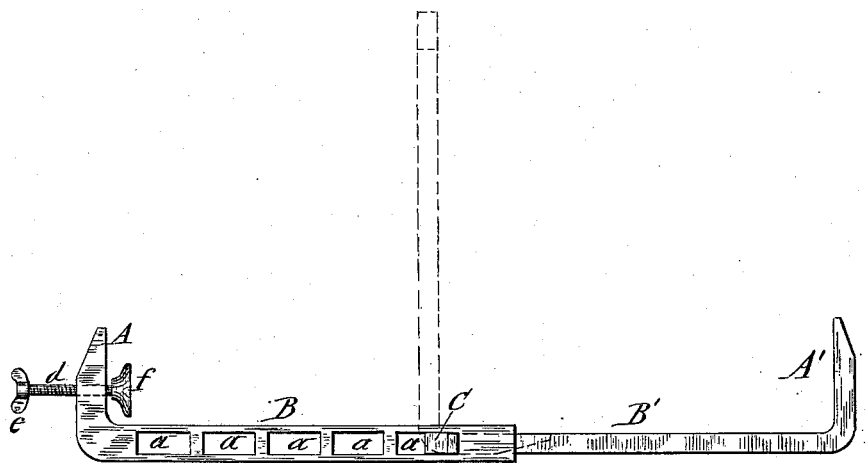
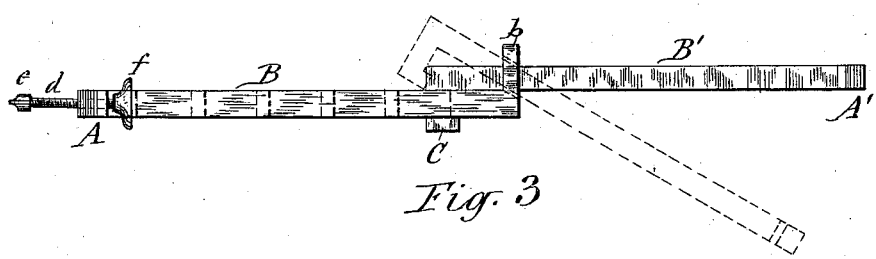
WITNESSES:
C. Bendixon
H. P. Denison
INVENTOR
William D. Hawley
BY
Duell, Laass & Duell
ATTORNEYS

UNITED STATES PATENT OFFICE.

WILLIAM D. HAWLEY, OF SYRACUSE, NEW YORK.

CLAMP.

SPECIFICATION forming part of Letters Patent No. 376,304, dated January 10, 1888.

Application filed April 11, 1887. Serial No. 234,359. (No model.)

*To all whom it may concern:*

Be it known that I, WILLIAM D. HAWLEY, of Syracuse, in the county of Onondaga, in the State of New York, have invented new and useful Improvements in Clamps, of which the following, taken in connection with the accompanying drawings, is a full, clear, and exact description.

This invention relates to the class of clamps which are employed by carpenters and other mechanics, chiefly by foundry-men, for the purpose of securing the cope to the drag or base of the flask; and the invention consists in an improved construction of an extensible or longitudinally-adjustable clamp which is adapted to be readily applied to flasks of different dimensions and securely tie the parts thereof together, as hereinafter more fully described.

In the annexed drawings, Figure 1 is a perspective view of my improved clamp, and Figs. 2 and 3 are respectively plan and side views of the same.

Similar letters of reference indicate corresponding parts.

A and A' represent the two gripping hooks or jaws of the clamp. The hook A is formed integral with one end of a shank, B, which is perforated at intervals of its length, as shown at $a\ a\ a$, and terminates with a lateral projection, $b$, which is also integral with the shank, and is provided with a perforation, $c$. The hook A' is formed integral with one end of a shank, B', which terminates with a supplemental hook, C, which is also formed integral with the shank B'. Said supplemental hook and shank are adapted to slide through the perforation $c$, and the supplemental hook is adapted to pass through either of the perforations $a\ a$, as represented by dotted lines in Fig. 3 of the drawings, and when so entered the two shanks B B' are coupled together. The described clamp is readily adjusted to the desired length by drawing the supplemental hook out of the perforation $a$, and, after sliding the shank B' toward or from the hook A until the two hooks A A' are the desired distance apart, introducing the supplemental hook C into the perforation $a$ which is nearest to the said hook. The clamp can be taken apart by drawing the hook A' out of the projection $b$, as shown by dotted lines in Fig. 2 of the drawings. Inasmuch as the perforations $a\ a$ do not always permit of adjusting the clamp to bring the hooks A A' the exact required distance apart, I connect with one of the clamp hooks or jaws a supplemental clamp in the form of a set-screw, $d$, which works in a screw-threaded eye extending through the jaw parallel with the shank thereof, the outer end of said set-screw being provided with a suitable head, $e$, by which to turn it, and the inner end of the screw being connected by a ball-and-socket joint with a foot, $f$, which serves as a bearing for one end of the clamp. In applying the clamp to the article to be held thereby the shanks B B' are first adjusted to bring the two hooks or jaws A A' in proximity to the parts to be engaged by the clamp. Then the clamp is tightened by turning the set-screw $d$ until the foot $f$ thereof is made to firmly bear on the article embraced by the clamp. For foundry-men's use the set-screw $d$ will be dispensed with.

Having described my invention, what I claim as new, and desire to secure by Letters Patent, is—

The improved adjustable clamp composed of the shank B, provided with the perforations $a\ a\ a$, and formed integral with the gripping-hook A and perforated lateral projection $b$, respectively at opposite ends, and the shank B', formed integral with the gripping-hook A' and coupling-hook C, respectively at opposite ends, and adapted to slide with said coupling-hook through the perforated projection $b$, and pass said coupling-hook into the perforation of the shank B, substantially as described and shown.

In testimony whereof I have hereunto signed my name and affixed my seal, in the presence of two attesting witnesses, at Syracuse, in the county of Onondaga, in the State of New York, this 8th day of April, 1887.

WILLIAM D. HAWLEY. [L. S.]

Witnesses:
  H. P. DENISON,
  C. BENDIXON.